Feb. 16, 1932.  H. L. PRINZ  1,845,184
AIRCRAFT
Filed Nov. 29, 1926   3 Sheets-Sheet 2
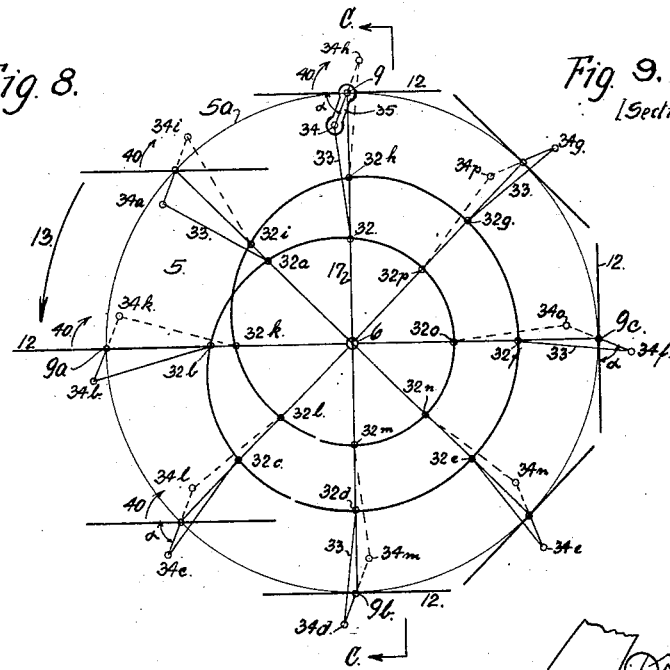
John Kaashoek
James Bourke
Witnesses.
Herman L. Prinz
Inventor.

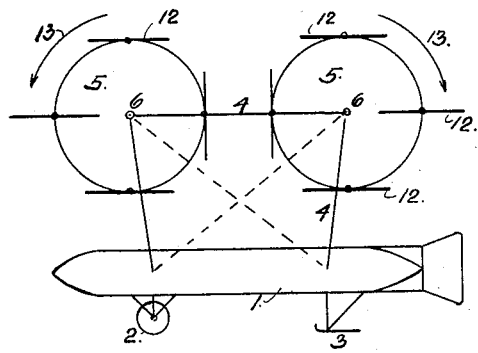
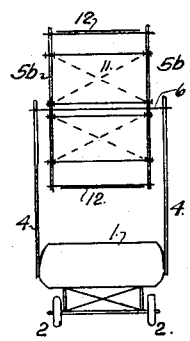
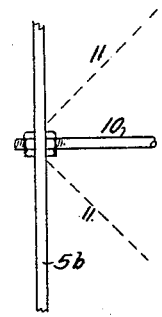
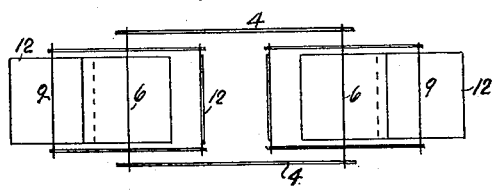
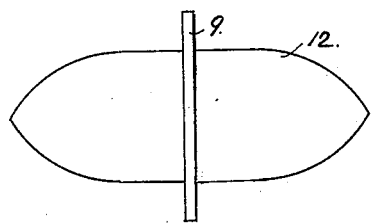
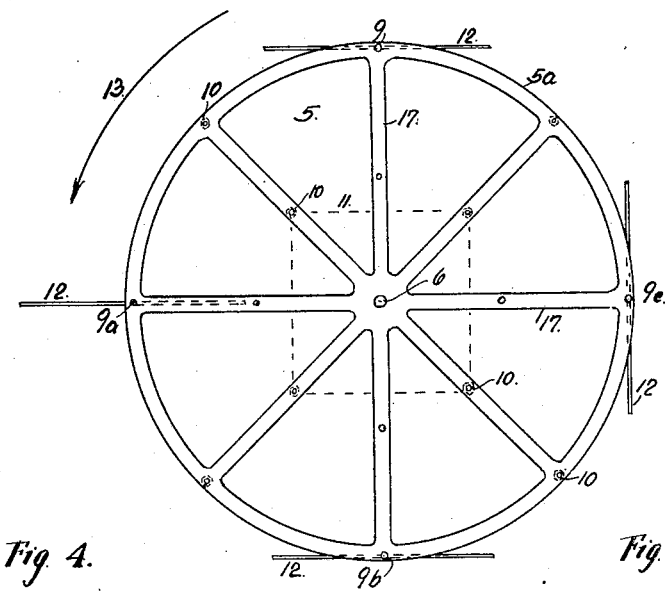
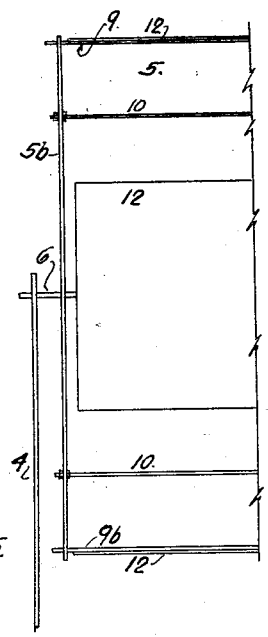

Feb. 16, 1932.  H. L. PRINZ  1,845,184
AIRCRAFT
Filed Nov. 29, 1926   3 Sheets-Sheet 3
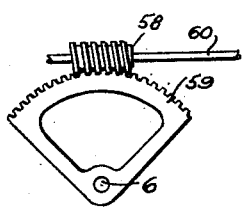
Fig. 18.
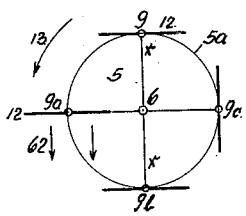
Fig. 15.
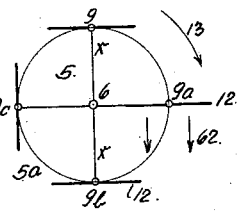
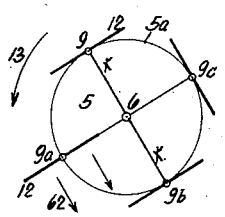
Fig. 16.
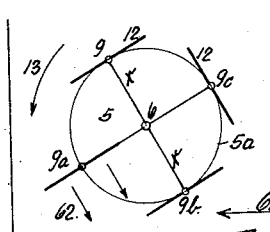
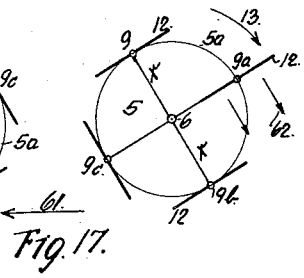
Fig. 17.
John Kaschak
James Bourke
Witnesses.
Herman L. Prinz.
Inventor.

Patented Feb. 16, 1932

1,845,184

UNITED STATES PATENT OFFICE

HERMAN L. PRINZ, OF CHICAGO, ILLINOIS

AIRCRAFT

Application filed November 29, 1926. Serial No. 151,432.

This invention relates to certain novel improvements in aircraft and more particularly to those parts of the same which exert pressure on the air for propulsive and lifting actions to meet the requirements of aerial navigation.

Among other objects of this invention is the production of an apparatus which will lift the aircraft vertically and which also will serve for propelling the aircraft in any direction and which will be more effective than airscrews.

As all parts of this aircraft are constructed of the lightest material generally used in aircraft construction, consistent with rigidity and strength and which will best serve the purpose, it will be sufficient to show only schematic diagram-drawings, and I may refrain from calling for the kind of material used in the construction of this aircraft.

The accompanying drawings which form an essential part of this specification will be now described in detail:

Fig. 1 is a schematic diagram showing the side-elevation of the aircraft,

Fig. 2 shows an end-elevation,

Fig. 3 shows a plan view from the top,

Fig. 4 shows a side-elevation of one lifting and propelling apparatus,

Fig. 5 shows an end-elevation of one lifting and propelling apparatus,

Fig. 6 is a detail of connection members,

Fig. 7 shows a modified form of a pressure-exerting element,

Fig. 8 shows a diagrammatical side-elevation of one lifting and propelling appartus, illustrating the process of action of one of the pressure-exerting elements, Fig. 9 shows a section along a vertical line of Fig. 8 near the center of the lifting and propelling apparatus. The left half of this section is shown only, Fig. 10 shows the part adjacent to the hub of a radial member of the constructive framework of the lifting and propelling appartus with a slot in which one follower can be pushed, Fig. 11 shows the part of the disk-shaped camplate in a larger scale than Fig. 12, where the large and the small grooves of the trisectrix-shaped slot, forming the guideway in which the followers are sliding, cross each other and where the regulating implements are mounted, Fig. 12 shows a disk-shaped camplate with the trisectrix-shaped slot forming the guideway for the followers, Fig. 13 is a section taken along the line D—D of Fig. 11, showing the two regulating implements in side-elevation (the slot in the camplate is not shown), Fig. 14 shows a plan looking down from line E—E Fig. 13, showing the regulating implements, Fig. 15 shows schematically the two lifting and propelling apparatuses with the positions of the pressure exerting elements when the aircraft is to be lifted vertically, (the imaginary planes x—x through the centers of both lifting and propelling apparatuses are standing vertically).

Fig. 16 shows the positions of the pressure-exerting elements when holding the aircraft motionless in the air, (the upper parts of the imaginary planes x—x are turned about the center points of the apparatuses to the left and to the right respectively), Fig. 17 shows the positions of the pressure-exerting elements when the aircraft is to be propelled in a forward direction, (the imaginary planes x—x of both lifting and propelling apparatuses are turned at their upper ends into the direction of the desired movement of the aircraft), Fig. 18 shows a worm gear and quadrant, a means suitable to adjust the position of the cam.

*General construction*

The hull (—1—) for the passengers, material, freight, fuel etc. is constructed in the usual manner. It is equipped with a pair of wheels (—2—) and a tailskid (—3—) or with two pair of wheels in the manner of an automobile body, or with pontoons for water-landing, or with a double outfit for both, land- and water-landing.

The steering of the aircraft, when rolling on the ground or when floating on water or when flying in the air will be in the usual manner.

The hull (—1—) is suspended by hangerframes (—4—) to the horizontally journaled mainshafts (—6—) about which a set of lifting apparatuses (—5—) rotate in vertical planes. These apparatuses (—5—) serve as well for lifting as for propelling the aircraft.

The following typical terms are used throughout the specifications and claims:

No. 6 will be called the "main-shaft". It is located in the center of the lifting and propelling apparatus (—5—). The whole lifting and propelling apparatus (—5—) rotates about it. The mainshaft (—6—) itself does not rotate, represents only the support for the lifting and propelling apparatus (—5—) and is journaled in the hanging frames (—4—).

No. 9 will be called the "wing-plate-shaft". It rotates and has its bearings in the circumference (—5a—) of the lifting and propelling apparatus (—5—).

Nos. (—9a—), (—9b—) and (—9c—) indicate different positions of the wing-plate shaft (—9—). Referring more particularly to Fig. 5, the lifting and propelling apparatus has two side frames (—5b—) which are connected with each other by spacing bars (—10—) Figs. 4 and 6, and with wire- or bar-crossbracings (—11—), shown in Figs. 4 and 6 in dotted lines. This structure as a whole will be called the "revolving system" (—5—). It supports in its circumference (—5a—) Fig. 4 the rotating wing-plate shafts (—9—) which are pivoted in said circumference (—5a—).

By the circumference (—5a—) is meant that imaginary curved surface traced by the axis of the wing-plate shafts (—9—) during a revolution of the revolving system (—5—).

The rotating wing-plates (—12—) are the pressure-exerting elements and are rigidly connected by rivets, bolts or any other means with their appertaining wing-plate shafts (—9—). They may have any number, for instance four as shown in the drawings, or any form, for instance a rectangular one, or as shown in Fig. 7.

The arrows (—13—) Figs. 4 and 1 show the direction of rotation of the lifting and propelling apparatuses.

The entire revolving system (—5—) rotates about the stationary main-shaft (—6—), driven by any suitable means, for instance by a so called radial engine (rotation motor) with rotating cylinders (motor not shown in the drawings) or by an ordinary aeroplane motor located in the hull (—1—) Fig. 1.

This motor is connected to the lifting and propelling apparatus (—5—) by means of belts or chains (not shown in the drawings). If a radial is used, it may preferably be placed on the stationary main-shaft (—6—).

The wing-plate shafts (—9—) are mounted in the circumference (—5a—) of the revolving system (—5—) at the points (—9—), (—9a—), (—9b—) and (—9c—) and rotate together with said system (—5—). The pressure exerting elements (—12—) rigidly connected with the wing-plate shafts (—9—) are automatically held in a horizontal position from the points (—9—) to (—9a—) and to (—9b—) Fig. 8, that is gradually during the downward movement of the circumference (—5a—), in Fig. 8 shown at the left hand side of the drawings.

During the remainder of the revolution from the points (—9b—) to (—9c—) and to (—9—) the plane of the pressure exerting elements (—12—) is tangential to the circumference (—5a—).

Whereas the pressure exerting elements (—12—) are pressing fully on the air during their downward movement they offer a minimum of resistance to the air during their upward movement.

It can be seen from Fig. 8, that, because the rotating pressure-exerting elements (—12—) are horizontal as well as tangential in their positions at (—9—) and (—9b—) and because they stay in this tangential position from (—9b—) to (—9c—) to (—9—), they press on the air during the first revolution of the revolving system with one side and during the next revolution with the reverse side, and so on alternatively. That means, that for every two revolutions of the revolving system (—5—) the pressure-exerting elements (—12—) revolve once about their respective pivots (—9—).

The pressure-exerting elements (—12—) on one side of the lifting and propelling apparatus (—5—), in Fig. 4 at the left side of the drawings, being in a horizontal position, it is apparent, that the apparatus (—5—) is shown in the proper act for lifting the aircraft.

As shown in Fig. 1 by the two arrows (—13—) the two lifting and propelling apparatuses (—5—) revolve in opposite directions and it is obvious that the two apparatuses (—5—) Fig. 1 must lift the aircraft when they are rotating with the proper velocity.

The above described motions of the pressure-exerting elements (—12—) are obtained by the mechanism now to be described. It has the advantage, that the transition from one slope to the other of the rotating wing-plates (—12—) can be effected very smoothly, eliminating a high acceleration in the changing of positions of the wing-plates.

The mechanism for shifting the slope of the wing-plates (—12—) consists mainly of positive motion plate-cams (—26—) and (—27—) Fig. 9. These cams are fastened on the stationary mainshaft (—6—) Figs. 9 and 12 and have a slot (—28—) designed to give the required motion. The cam-plates, cut by the slot (—28—) are restored to one single unit by connecting plates (—29—), (—30—) and (—31—) Fig. 12.

For each lifting and propelling apparatus (—5—) there are two cams (—26—) and (—27—) Fig. 9.

Followers (—32—) Figs. 8, 9 and 10 slide in the slots (—28—), and each follower is pushed forward by one of the radial members (—17—) Fig. 10 of the revolving system (—5—). Each of the followers (—32—) is connected by a connecting rod (—33—) to the crank-pin (—34—) and to the crank (—35—) which is fastened to the rotating wing-plate shaft (—9—) and so to the wing-plate or pressure-exerting element (—12—).

The crank (—35—) makes an angle $\alpha$ Fig. 8 less than 90 degrees with the plane of the wing-plate (—12—) in order to eliminate "dead centers". There is one unit, consisting of follower (—32—), connecting rod (—33—), crank-pin (—34—) and crank (—35—) for each pressure-exerting element (—12—).

The action of the pressure-exerting elements is the following: Let Fig. 8 show a diagram of the various positions of one unit for rotating one pressure-exerting element (—12—) during one revolution of the revolving system (—5—). Suppose that the pressure-exerting element (—12—) is in a horizontal position at the top (—9—) of the lifting and propelling apparatus (—5—), the position necessary for lifting the aircraft.

Then the crank-pin (—34—) would gradually have to take the positions (—34a—), (—34b—), (—34c—) and (—34d—) to keep the pressure-exerting element (—12—) horizontal during this half of the revolution of the revolving system (—5—). That means that the connecting rod (—33—) having a constant length—the follower (—32—) gradually has to take the positions (—32a—), (—32b—), (—32c—) and (—32d—). These points on the respective radii (—6—9—), (—6—9a—) and (—6—9b—) determine the curve of the slot (—28—), indicated in Fig. 8 by one line only, the center-line of the slot (—28—).

In the other half of its cycle the follower (—32—) moves in a semi circle concentric with the circumference (—5a—) of the revolving system (—5—), and that from (—32d—) to (—32e—) to (—32f—) to (—32g—) and to (—32h—), or in other words: the pressure exerting element (—12—) remains in the position it had at (—9b—) namely tangent to the circumference (—5a—), while moving from (—9b—) to the top (—9—) of the revolving system (—5—).

During the next revolution of the revolving system (—5—) the crank-pin (—34—) gradually has to take the positions (—34h—), (—34i—), (—34k—), (—34l—), (—34m—), (—34n—), (—34o—), (—34p—) and back to (—34—), and the follower (—32—) is guided by the properly designed slot (—28—) from (—32h—) over (—32i—) etc. back to (—32—), from which point the above described process is repeated.

So the follower (—32—) moves from the inner slot at (—32a—) Fig. 8 into the outer slot at (—32b—), then makes the circuit of the outer slot from (—32b—) and so on to (—32i—). It enters the inner slot at (—32k—) and makes the circuit of the inner slot from (—32k—) and so on to (—32a—) where it reenters the outer slot and repeats the cycle.

The follower (—32—), moved along slot (—28—) by the radial member (—17—) Fig. 10 of the revolving system (—5—) has to change its course after one revolution of the revolving system (—5—) from the inner slot of the cam (—26—) to the outer slot and then in inverted order.

This is done by a set of two lever-switches (—36—) and (—37—) Figs. 11, 13 and 14.

These switches close steadily the inner and the outer slot of the cam (—28—) as shown in Fig. 11 at (—36—) and (—37—). When the follower (—32—) Fig. 11 is pushed by the radial member (—17—) Fig. 10 through the inner slot along arrow (—38—), it has to open the switch (—36—) by swinging it around to the position (—36a—), in Fig. 11 shown in dotted lines. This provides passage from the inner to the outer slot—see arrows (—38—) and (—38a—), for the switch (—37—) closes one way indicated by arrow (—39—), and the other switch (—36—) closes the other way, indicated by arrow (—39a—) by its new position at (—36a—). As soon as the follower (—32—) has opened and passed the switch (—36—), the latter snaps back into its former position at (—36—).

Consequently the follower (—32—) has to follow the path indicated by the arrows (—38—) and (—38a—).

It then makes the circuit of the outer slot and comes to the position of the arrow (—39—). It moves switch (—37—) to position (—37a—), closing the entrance to the outer slot at arrow (—38a—) and the way to the inner slot at arrow (—39a—) has to be taken. In its course the follower (—32—) arrives again at arrow (—38—), and the described cycle is repeated.

The switch (—36—) is pivoted at point (—42—) Figs. 11 and 13, and switch (—37—) is pivoted at point (—41—). The spring (—44—) or any other elastic body which is laid around pulleys (—43—) and (—43a—) and fastened to them at the points (—46—)

and (—45—), holds said switches in their positions (—36—) and (—37—) Fig. 11 respectively, by pulling in the directions of the arrows (—47—) and (—47a—).

The movements of the switches (—36—) and (—37—) is limited in some way, for instance by the two pins (—49—) and (—48—) Fig. 13, which are fastened in the switches (—36—) and (—37—) respectively, and which slide in grooves of fitting length (—51—) and (—50—) Fig. 13, grooved into the cam (—26—).

The lifting and propelling apparatus (—5—) having been described as also the manner in which it lifts the aircraft, it remains to show how the apparatus (—5—) propels the aircraft.

When the imaginary planes x—x, both of which are shown vertically in Fig. 15 are turned counter-clockwise as in Fig. 17 to make a certain angle with the vertical it will be apparent that the aircraft is pushed forward. The current of air, caused by the pressure exerting elements (—12—) is indicated by the arrows (—62—). It can be seen that the air current is forced backward and downward, and that the aircraft will be driven forward, namely in the direction of the arrow (—61—) Fig. 17.

Changing the angles of the imaginary planes x—x, that is turning the stationary main-shaft (—6—) can be accomplished by means of a worm gear (—58—) Fig. 18 and a quadrant (—59—). The quadrant (—59—) is keyed to the main-shaft (—6—), and the worm gear (—58—) to the shaft (—60—). This shaft (—60—) is manipulated by the pilot in the hull (—1—), either directly or indirectly by means of a flexible band, for instance a chain, and it can be turned by a hand-wheel (not shown) whenever and however it will be necessary.

While I have shown and described the preferred forms of the construction of the aircraft, it will be apparent, that various changes and alterations may be made during the manufacture without departing from the spirit of this invention and from the scope of the appended claims.

What I claim as new and useful is:

1. In combination with an aircraft a number of lifting and propelling apparatuses, each including a supporting member rigidly attached to the body of the aircraft; a system of constructive framework, motor-rotated about said supporting member; a plurality of pressure-exerting elements journaled in said framework; moving means for said pressure exerting elements, comprising a camplate having a trisectrix-shaped guideway formed therein, a plurality of followers pushed by members of the motor-rotated framework and sliding in said trisectrix-shaped guideway, regulating implements to control the path of said followers; operative means jointly connecting the moving means with the pressure exerting elements; and means to adjust the position of said moving means.

2. In combination with an aircraft a number of lifting and propelling apparatuses, each including a supporting member rigidly attached to the body of the aircraft; a system of constructive framework motor-rotated about said supporting member; a plurality of pressure-exerting elements journaled in members of said framework; moving means for said pressure exerting elements comprising a camplate having cut therein a guideway, which forms a slot composed of two grooves forming parallel concentric semi-circles of different diameters and of two grooves crossing each other and forming two parabolas each of which connects one end of the smaller semi-circular groove with one end of the large semi-circular groove, a plurality of followers and a number of regulating implements; operative means jointly connecting the moving means with the pressure exerting elements; and means to adjust the position of said moving means.

3. In combination with an aircraft a number of lifting and propelling apparatuses each including a supporting member rigidly attached to the body of the aircraft; a system of constructive framework motor-rotated about said supporting member; a plurality of pressure exerting elements journaled in members of said framework; moving means for said pressure exerting elements comprising a camplate having a trisectrix-shaped groove cut therein, a plurality of followers and a number of regulating implements pivotally mounted on the camplate and leading automatically said followers through the crossing point of said trisectrix-shaped groove in such a manner that said followers enter alternately the larger curve or the smaller curve of said groove; means to transmit the action of the moving means to said pressure exerting elements; and means to adjust the position of said moving means.

4. In combination with an aircraft a number of lifting and propelling apparatuses, each including a supporting member rigidly attached to the body of the aircraft; a system of constructive framework motor-rotated about said supporting member; a plurality of pressure exerting elements journaled at the ends of members of said framework; moving means for said pressure exerting elements comprising a camplate having a trisectrix-shaped guideway cut therein, a plurality of followers and a number of regulating implements pivotally mounted on the camplate and closing permanently over one groove of said guideway but being automatically opened by said followers sliding in the guideway so leading the followers alternately from the small curve into the large curve of said guideway and vice-versa; means to transmit the action of the moving means to said pressure exerting elements; and means to adjust the position of said moving means.

5. In combination with an aircraft a number of lifting and propelling apparatuses, each including a supporting member rigidly attached to the body of the aircraft; a system of constructive framework motor-rotated about said supporting member; a plurality of pressure exerting elements journaled at the ends of members of said framework; moving means for said pressure exerting elements comprising a camplate, a plurality of followers and a number of regulating implements pivotally mounted on the camplate and elastic tension means acting upon said implements by switching them back into their initial closing position after each opening by said followers; means to transmit the action of the moving means to said pressure exerting elements; and means to adjust the position of said moving means.

6. In an aircraft the combination of a fuselage, landing wheels or pontoons and means for driving and steering with a number of apparatuses adapted for lifting and for propelling the aircraft by rotating about transverse horizontal members rigidly attached to the body of the aircraft. Each lifting and propelling apparatus built up by a system of constructive framework including hubs revolvable about one of said horizontal members; a plurality of pressure exerting elements pivoted in the circumference of said framework and revolving together with it but rotated also about their own horizontal transverse central axes independently of the rotation of the framework which supports the bearings of their pivots; moving means effecting the rotation of said pressure exerting elements and comprising a disk-shaped cam having a trisectrix-shaped guideway cut therein and regulating implements mounted thereon; operative means connecting the moving means with the pressure exerting elements; and means—operable from the cockpit of the aircraft—to adjust gradually the position of said moving means.

In testimony whereof I affix my signature.

HERMAN L. PRINZ.